United States Patent [19]

Ogawa

[11] Patent Number: 5,198,851
[45] Date of Patent: Mar. 30, 1993

[54] CAMERA SYSTEM

[75] Inventor: Hidehiro Ogawa, Funabashi, Japan

[73] Assignee: Nikon Corporation, Tokyo, Japan

[21] Appl. No.: 826,535

[22] Filed: Jan. 27, 1992

[30] Foreign Application Priority Data

Feb. 6, 1991 [JP] Japan ................................ 3-035126

[51] Int. Cl.⁵ .............................................. G03B 17/18
[52] U.S. Cl. .................................... 354/412; 354/471; 354/289.12
[58] Field of Search ................ 354/412, 289.1, 289.12, 354/465, 471, 474, 475, 295, 105, 106

[56] References Cited

U.S. PATENT DOCUMENTS

| | | | |
|---|---|---|---|
| 4,217,046 | 8/1980 | Weinstein et al. | 354/106 X |
| 4,344,682 | 8/1982 | Hattori | 354/106 X |
| 4,455,068 | 6/1984 | Izuhara | 354/412 |
| 4,853,733 | 8/1989 | Watanabe et al. | 354/412 |
| 4,920,371 | 4/1990 | Kaneko | 354/412 |
| 4,931,823 | 6/1990 | Nakajima et al. | 354/412 |
| 4,962,397 | 10/1990 | Ishikawa et al. | 354/412 |
| 4,999,661 | 3/1991 | Ueno et al. | 354/412 X |
| 5,036,344 | 7/1991 | Inoue et al. | 354/106 |
| 5,040,016 | 8/1991 | Ishikawa et al. | 354/412 |
| 5,097,283 | 3/1992 | Kazumi | 354/412 |

Primary Examiner—W. B. Perkey
Attorney, Agent, or Firm—Shapiro and Shapiro

[57] ABSTRACT

A camera system comprises a terminal device, a camera and a connection device. The terminal device includes an IC card for storing information on the camera, a display for reading and displaying the information of the IC card communication means for transmitting those of the read information which are necessary to set an operation condition of the camera to the camera. The camera includes a connector and receives necessary information to set the operation condition of the camera through the connector. The connection device connects the communication means of the terminal device and the connector of the camera.

6 Claims, 15 Drawing Sheets

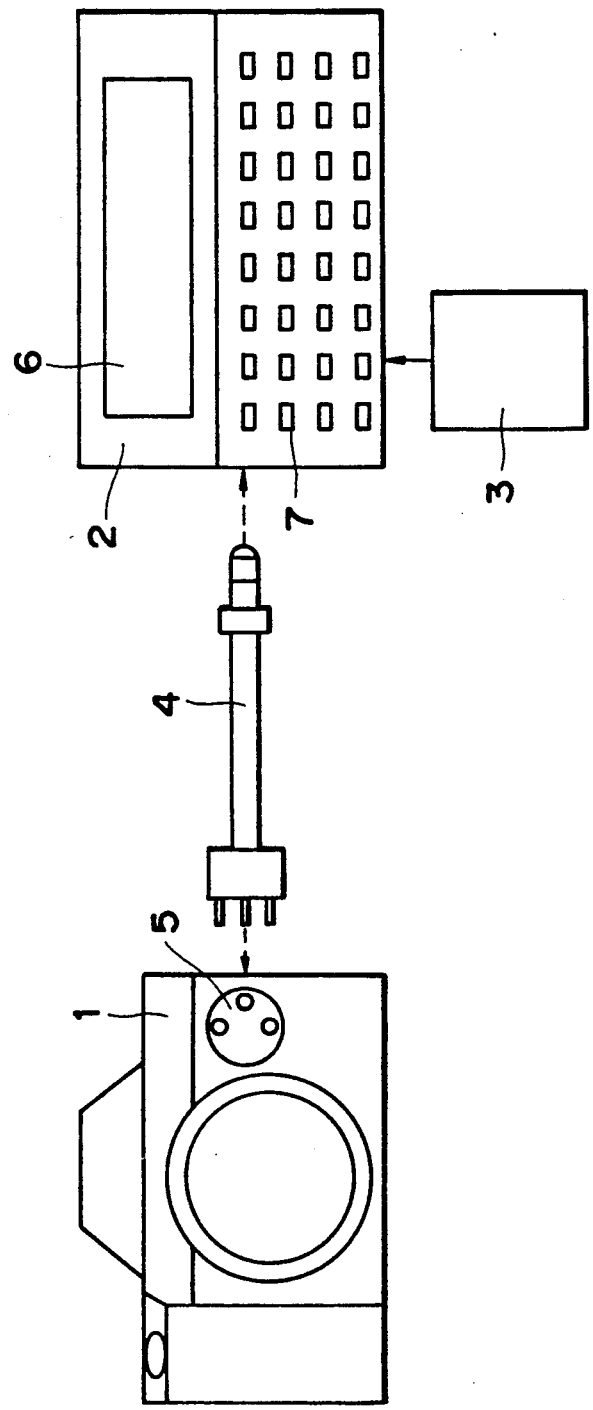

FIG.2

ELECTRONIC MANUAL

CAMERA DICTIONARY

INFORMATION

COMMUNICATION WITH CAMERA

BASIC OPERATION

ADVANCED OPERATION

HOW TO USE FLASH LIGHT

HOW TO USE DATA BACK

HOW TO COMPENSATE EXPOSURE

HOW TO MULTIPLE EXPOSURE

AUTO BRACKETING

PROGRAM SHIFT

TURN COMMAND DIAL WITH

PUSHING BUTTON .

+ IS OVEREXPOSURE

− IS UNDEREXPOSURE

FIG.4A

LENS

FILM

FLASH LIGHT

LIGHTING

FIG.4B

FOCAL LENGTH

F NUMBER AT OPEN APERTURE

DEPTH OF FIELD

MAGNIFICATION

FIG.4C

F NUBMER = D/f

WHERE D = LENS DIAMETER f = LENS FOCAL LENGTH

BRIGTNESS IS PROPORTIONAL

SERVICE STATION

SHOWROOM

FIG.5B

TOHOKU HOKKAIDO AREA

KANTO CHUBU AREA

KINKI CHUGOKU AREA

SHIKOKU KYUSHU AREA

FIG.5C 1-2-3 MARUNOUCHI

CHIYODA TOKYO

TEL 03-123-4567

CLOSED ON MONDAY

FIG.6A

REMOTE CONTROL

USER CUSTOMIZE

SETTING OF DATA BACK

FIG.6B

SETTING OF CAMERA-SHAKE ALARM

SETTING OF FILM SPEED

SETTING OF FILM END PROCESS

SETTING OF EASY LOAD

FIG.6C

ALARM SOUND ON

AT CAMERA-SHAKE LIMIT

YES / NO

FIG. 7

THIS IC CARD IS FOR

○○○,

CANNOT BE USED FOR △△△.

```
REMOTE DISPLAY

SETTING OF METERING MODE
 SETTING OF EXPOSURE MODE
*SETTING OF SHUTTER SPEED
 SETTING OF APERTURE
 SETTING OF FILM SPEED
```

EXPOSURE MODE : P
SHUTTER       : 125
APERTURE      : F5.6
METERING MODE : 
ISO           : DX
AF            : ▷●◁

[16]
HELP

SETTING OF EXPOSURE MODE

P : PROGRAMED AUTO
S : SHUTTER PRIORITY AUTO
A : APERTURE PRIORITY AUTO
M : MANUAL

FIG. 8D

```
PRESENTLY LOADED FILM IS
NOT DX FILM.
PLEASE SET FILM SPEED
MANUALLY.
                            ESC
```

FIG. 8E

```
PROGRAMED AUTO MODE BEING
SELECTED,
YOU CANNOT SET SHUTTER
SPEED.
                            ESC
```

FIG.9A

SETTING OF CLOCK

SELECTION OF DATA TO BE IMPRINTED

SETTING OF INTERVAL TIMER

SET TIME ?

START AT : 10th DAY 11:00

INTERVAL : 0 hrs. 10 min. 00 sec

THE NUMBER OF TIMES : ▨ TIMES

PLEASE INPUT NUMENICAL VALUES

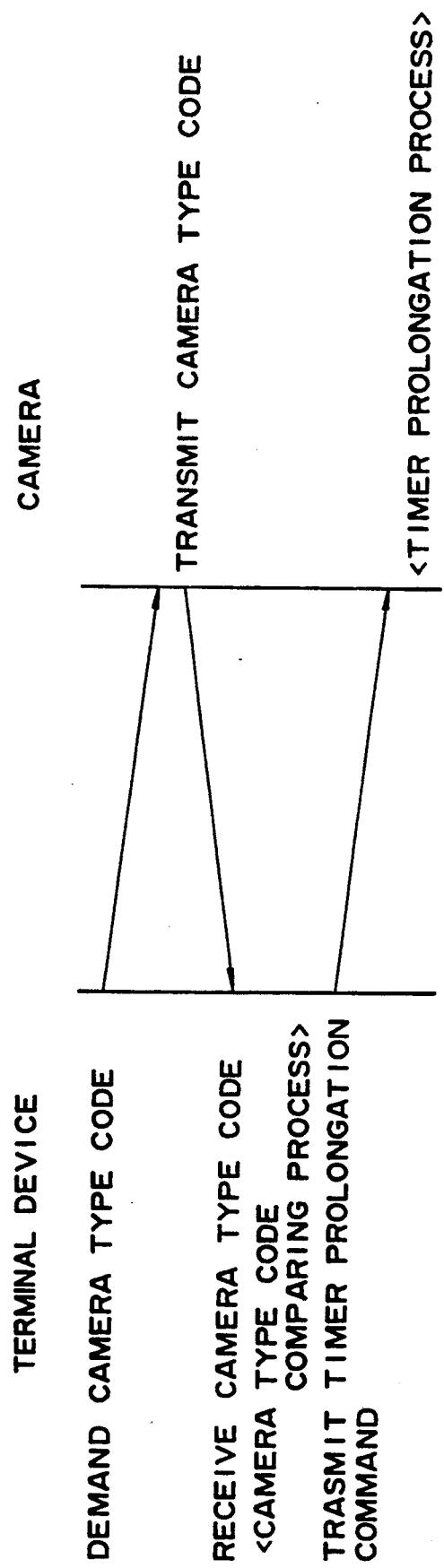

CAMERA SYSTEM

BACKGROUND OF THE INVENTION

1. Field of the Invention

The present invention relates to a camera system for transmitting and receiving data to and from a camera by obtaining information on the camera or a photograph and communicating with the camera by using a commercially available pocket computer or electronic organizer and a camera IC card compatible therewith.

2. Related Background Art

In the past, data is exchanged with a camera to control various operations based on the data. A personal computer or a controller is used as a unit to receive and transmit such data.

However, since such a unit is of large size or needs an AC power supply, it is inconvenient to carry it with the camera. Further, it is expensive.

SUMMARY OF THE INVENTION

In the light of the above, it is an object of the present invention to provide a camera system which is ready to carry and economic.

The camera system of the present invention comprises a terminal device including an IC card for storing information on a camera, display means for reading and displaying the information of the IC card and communication means for transmitting those information of the read information which are necessary to set an operation condition of the camera, a camera having a connector for receiving the information necessary to set the operation condition of the camera through the connector, and connecting means for connecting the communication means of the terminal device with the connector of the camera.

In the present camera system, the terminal device reads and displays the information of an IC card which stores the information on the camera and transmits the information to the camera when required to set the operation condition of the camera. Normally, information on a photograph is obtained from a display content of the terminal device, and a user takes a necessary action in accordance with the information. When a complex camera operation condition is to be set, necessary data is transmitted from the terminal device to the camera so that the camera operation condition is set in accordance with the data.

In accordance with the camera system of the present invention, the explanation on the manipulation of the camera and the information on the location of a service station are displayed by the portable terminal device and the IC card, and necessary information is always available where they are carried with the camera. Further, it can be readily customized by interactive communication with the camera, and the setting of a data pack which has heretofore been complex is facilitated. In the past, a separate remote controller is needed to remotely control various functions of the camera, and it is necessary to design such a remote controller. By the use of the terminal device, only software need be designed and the number of development steps is reduced. Thus, an inexpensive system which has easy-to-use functions is provided.

BRIEF DESCRIPTION OF THE DRAWINGS

FIG. 1A shows a system configuration of one embodiment of the present invention, FIG. 2 shows an example of a displayed image, FIGS. 4A to 4C show examples of displayed images, FIGS. 5A to 5C show examples of the displayed images, FIGS. 6A to 6C show examples of displayed images, FIG. 7 shows an example of a displayed image, FIGS. 8A to 8E show examples of displayed images, FIGS. 9A to 9C show examples of displayed images, FIG. 10 shows a sequence of transmitting and receiving signals.

DETAILED DESCRIPTION OF THE PREFERRED EMBODIMENTS

Figure 1B:
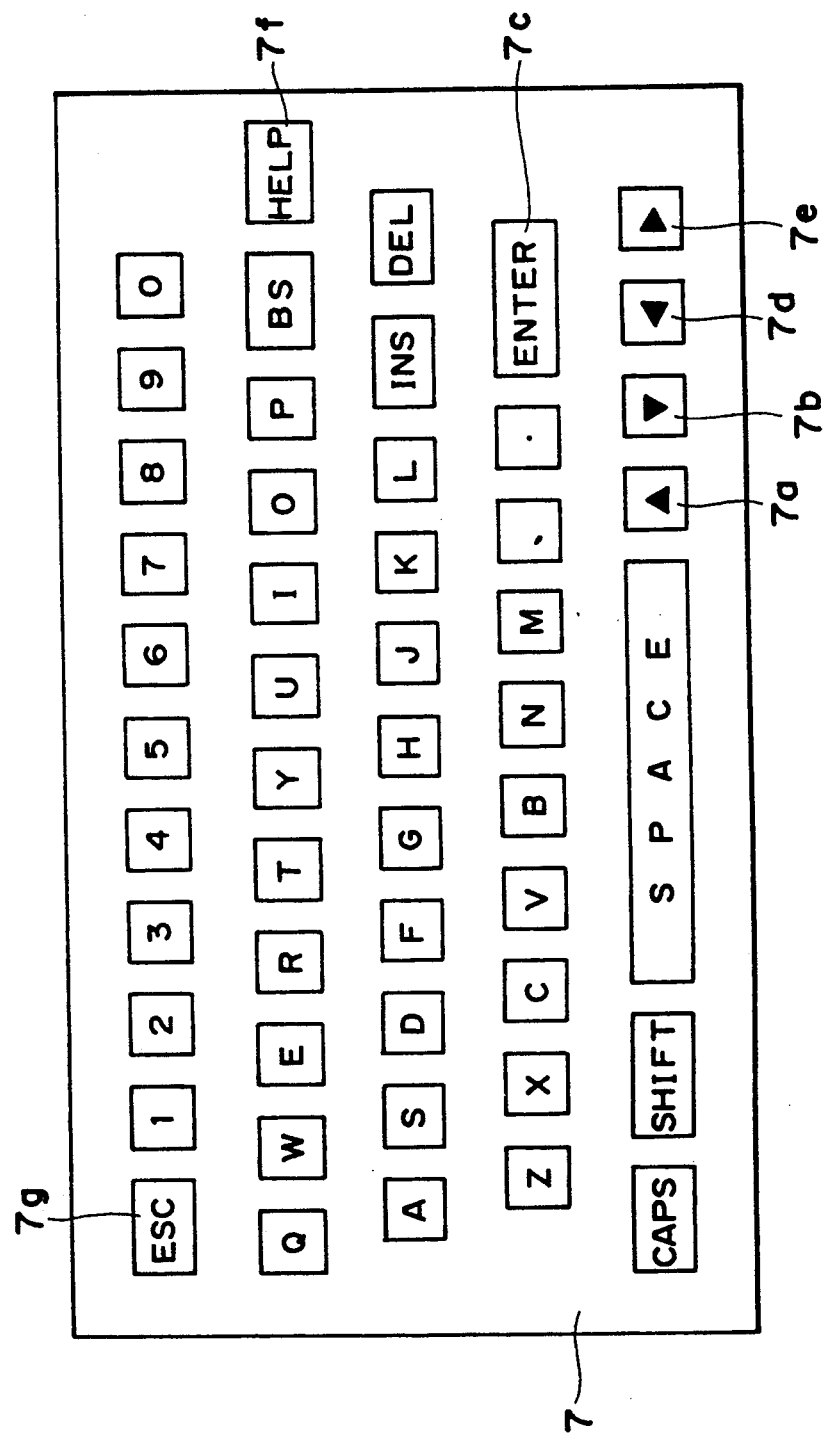
FIG. 1B shows a keyboard 7 of a terminal device 2.

FIG. 1A shows a block diagram of one embodiment of the present invention. Numeral 1 denotes a camera, numeral 2 denotes a terminal device, numeral 3 denotes an IC card which is loadable to the terminal device 2 and which stores a program for driving the terminal device 2, numeral 4 denotes a cable for connecting the camera and the terminal device, numeral 5 denotes a connector of the camera which includes a signal line terminal for communicating with the terminal device 2, numeral 6 denotes a display of the terminal device and numeral 7 denotes a keyboard (see FIG. 1B) of the terminal device. A connector which engages with the connector 5 of the camera 1 is provided at one end of the connection cable 4, and a connector which engages with a communication connector (not shown) of the terminal device 2 is provided at the other end.

The electrical connection between the camera 1 and the terminal device 2 includes at least three signal lines, a ground line, a signal line (TX) for transmitting a stepping synchronous communication system signal (UART signal) and a receiving signal line (RX). The ground lines of the camera 1 and the terminal device 2, the TX terminal of the camera 1 and the RX terminal of the terminal device 2, and the RX terminal of the camera 1 and the TX terminal of the terminal device 2 are connected together, respectively.

FIG. 2 shows a menu display screen of the display 6 when the terminal device 2 is driven by the camera IC card 3. Four items, "ELECTRONIC MANUAL", "CAMERA DICTIONARY", "INFORMATION" and "COMMUNICATION WITH CAMERA" are displayed, and only "ELECTRONIC MANUAL" is invertedly displayed. It indicates that "ELECTRONIC MANUAL" is selected as default. The inverted display is shifted to other item by depressing up/down keys 7a and 7b of the terminal device 2 shown in FIG. 1B. A desired item is selected by the up/down keys 7a and 7b and an execution key or an equivalent key is depressed to display the next image.

Figures 3A, 3B, 3C:
FIGS. 3A to 3C show examples of displayed images.

FIGS. 3A to 3C show displays of the display 6 which appear when the execution key 7c is depressed while "ELECTRONIC MANUAL" of FIG. 2 is selected.

They display description equivalent to that of an operation manual of the camera.

When the execution key 7c is depressed while "ELECTRONIC MANUAL" is selected, the display shown in FIG. 3A appears. Form items, "BASIC OPERATION", "ADVANCED OPERATION", "HOW TO USE FLASH LIGHT" and "HOW TO USE DATA BACK" are displayed. When "BASIC OPERATION" is selected by depressing the up/down keys 7a and 7b and the execution key 7c is depressed, four items, "HOW TO CORRECT EXPOSURE", "HOW TO MULTIPLE-EXPOSE", "AUTO-BRACKETING" and "PROGRAM SHIFT" appear. When "HOW TO EXPOSE" is selected by depressing the up/down keys 7a and 7b and depressing the execution key 7c, a manner to correct the exposure is displayed by a text, as shown in FIG. 3C. In a similar manner, description on "ADVANCED OPERATION", "HOW TO USE FLASH LIGHT" and "HOW TO USE DATA BACK" are displayed by texts.

FIGS. 4A to 4C show displays of the display 6 when "CAMERA DICTIONARY" in FIG. 2 is selected and the execution key 7c is depressed. FIG. 4A shows terminologies relating to the camera. Four items "LENS", "FILM", "FLASH LIGHT" and "LIGHTING" are displayed. When "LENS" is selected by depressing the up/down keys 7a and 7b and the execution key 7c is depressed, the display shown in FIG. 4B appears. Four items relating to the lens, "FOCAL LENGTH", "F NUMBER AT OPEN APERTURE", "DEPTH OF FIELD" and "MAGNIFICATION" are displayed as shown in FIG. 4B. When "F NUMBER AT OPEN APERTURE" is selected by depressing the up/down keys 7a and 7b and the execution key 7c is depressed, the description on the F number at the open aperture is displayed as shown in FIG. 4C.

When "INFORMATION" of FIG. 2 is selected by depressing the up/down keys 7a and 7b and the execution key 7c is depressed, the display shown in FIG. 5A appears. Two items, "SERVICE STATION" and "SHOWROOM" are displayed as shown in FIG. 5A. When "SERVICE STATION" is selected by the up/down keys 7a and 7b and the execution key 7c is depressed, the display shown in FIG. 5B appears. Four local areas of the service stations in Japan, "TOHOKU, HOKKAIDO", "KANTO, CHUBU", "KINKI, CHUGOKU" and "SHIKOKU, KYUSHU" are displayed. When "KANTO, CHUBU" is selected by depressing the up/down keys 7a and 7b and the execution key 7c is depressed, location, phone number and closed day of one of the service stations are displayed as shown in FIG. 5C. When there are other service stations in the "KANTO, CHUBU" area, other function key of the display device 2 is depressed so that they are sequentially displayed.

When "COMMUNICATION WITH CAMERA" of FIG. 2 is selected by depressing the up/down keys 7a and 7b, the camera 1 and the terminal device 2 may be connected by the cable 4 as shown in FIG. 1 to transmit or receive data between the camera 1 and the terminal device 2 or send a command. When "COMMUNICATION WITH CAMERA" of FIG. 2 is selected and the execution key 7c is depressed, the display shown in FIG. 6A appears. Three items, "REMOTE CONTROL", "USER CUSTOMIZATION" and "SETTING OF DATA BACK" are displayed. When "REMOTE CONTROL" is selected, the camera 1 may be operated from the terminal device 2. For example, a shutter speed may be changed or a shutter may be released. When "USER CUSTOMIZATION" is selected, the function of the camera may be set as the user desires. When "SETTING OF DATA BACK" is selected, the data back of the camera may be set from the terminal device 2.

When "USER CUSTOMIZATION" of FIG. 6A is selected by depressing the up/down keys 7a and 7b and the execution key 7c is depressed, the display shown in FIG. 6B appears. Four items, "SETTING OF ALARM FOR CAMERA SHAKE", "SETTING OF FILM SENSITIVITY", "SETTING OF PROCESS FOR END OF FILM" and "SETTING OF EASY LOAD" are displayed. When "SETTING OF ALARM FOR CAMERA SHAKE" is selected by depressing the up/down keys 7a and 7c and depressing the execution key 7c, the display of FIG. 6C appears. When an alarm by sound is required for a limit to the camera shake, "YES" is selected by depressing the up/down keys 7a and 7b, and when it is not required, "NO" is selected, and the execution key is depressed so that a signal is sent from the terminal device 2 to the camera 1 to allow the setting of the selected alarm in the camera 1.

Where a plurality of IC cards 3 of the terminal device 2 are provided one for each of the types of cameras 1, it cause a problem if the terminal device IC card B is used for the communication with the camera A, because the function and the data format vary from type to type of the camera. Accordingly, when the communication is to be made between the camera 1 and the terminal device 2, it is necessary to first identify the type. To this end, a command which requests a type code of the camera 1 is sent from the terminal device 2 to the camera 1, and the type data sent back from the camera is compared with the type code stored in the IC card. When the type codes match, the communication is permitted, and when they do not match, an error message is displayed on the display 6 of the terminal device 2 and further communication is inhibited.

Figure 7:
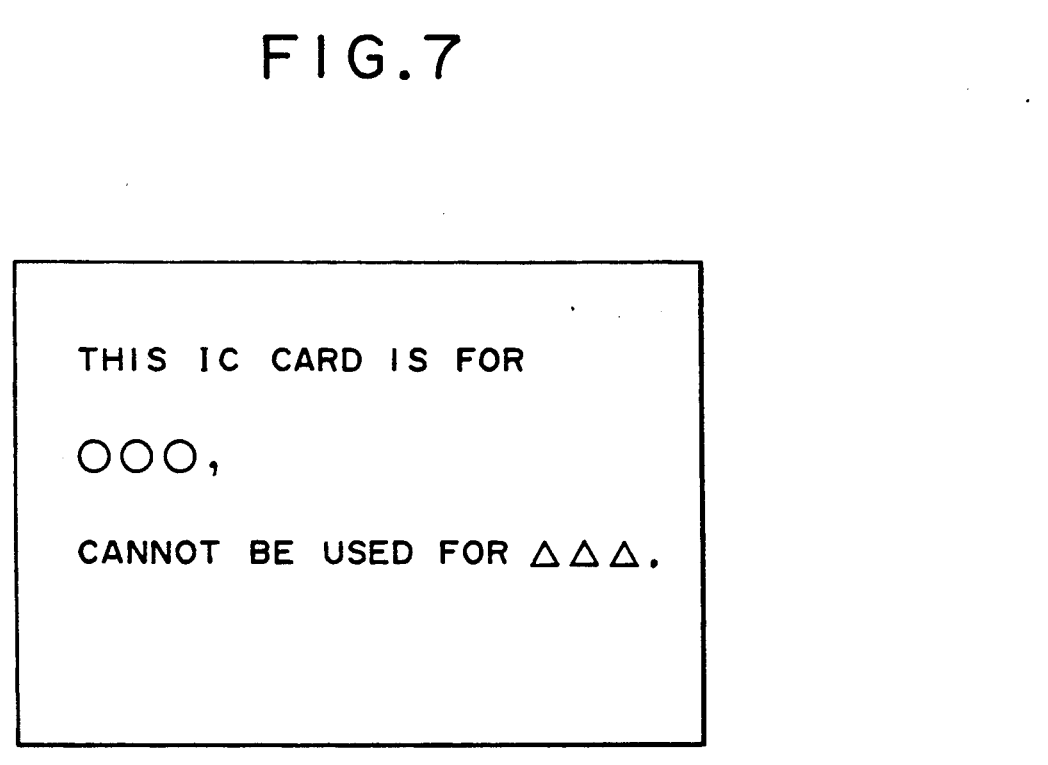

FIG. 7 shows an example of the error message displayed on the display 6. By using a character code of the type of camera as the type code, the error message as shown in FIG. 7 may be displayed.

Figures 8A, 8B, 8C:

When "REMOTE CONTROL" of FIG. 6A is selected by depressing the up/down keys 7a and 7b and the execution key 7c is depressed, the display shown in FIG. 8A appears. Six items, "REMOTE DISPLAY", "SETTING OF METERING MODE", "SETTING OF SHUTTER SPEED", "SETTING OF APERTURE" and "SETTING OF FILM SENSITIVITY" are displayed.

In FIG. 8A, a mark "*" is put on "SETTING OF SHUTTER SPEED". It indicates that the selection of "SETTING OF SHUTTER SPEED" is not permitted because a programmed auto-exposure control mode or an aperture priority auto-exposure control mode is currently set as the auto-exposure control mode of the camera 1. The mark "*" indicates the item which cannot be selected depending on the setting of the photographing control condition of the camera 1.

When "REMOTE DISPLAY" is selected by depressing the up/down keys 7a and 7b and the execution key 7c is depressed, the display as shown in FIG. 8B appears.

The display of FIG. 8B shows the current setting of the photographing control condition of the camera 1. In the example of FIG. 8B, the auto-exposure control mode is set to "P" or a programmed auto-exposure control mode, the shutter speed to attain a proper exposure is set to "125" or 1/125 second in accordance with a program diagram, the aperture is set to "F 5.6", the metering mode is set to a fine-split multi-pattern metering mode, a film having an ISO sensitivity of "DX" is not loaded, and an in-focus state is attained by AF or auto-focusing detection.

When a HELP key 7f of the keyboard 7 in FIG. 1B is depressed in accordance with the display of "HELP" in FIG. 8B, an error message shown in FIG. 8D is displayed in text to inform to the user that a DX film is not loaded and the ISO sensitivity should be manually set. When an ESC key 7g of the keyboard 7 is thereafter depressed in accordance with the display of "ESC" in FIG. 8D the display of FIG. 8B appears again. When the execution key 7c is depressed while the display of FIG. 8B appears, the display of FIG. 6A appears again.

FIG. 8C shows the display which appears when "SETTING OF EXPOSURE MODE" in FIG. 8A is selected. It includes four exposure control modes, "P: PROGRAMMED AUTO", "S: SHUTTER PRIORITY AUTO", "A: APERTURE PRIORITY AUTO" and "M: MANUAL". When "P: PROGRAMMED AUTO" or the programmed auto-exposure control mode is selected by depressing the up/down keys 7a and 7b and the execution key 7c is depressed, a signal is sent from the terminal device 2 to the camera 1 to set the programmed auto-exposure control mode.

When "SETTING OF SHUTTER SPEED" is selected by depressing the up/down keys 7a and 7b and the execution key 7c is depressed, an error message as shown by the text in FIG. 8B, that is, "PROGRAMMED AUTO MODE IS CURRENTLY SELECTED. YOU CANNOT SET SHUTTER SPEED." is displayed because the camera 1 is now in the programmed auto-exposure control mode.

When "SETTING OF DATA BACK" of FIG. 6A is selected by depressing the up/down keys 7a and 7b and the execution key 7c is depressed, the display as shown in FIG. 9A appears. Three items, "SETTING OF TIME", "SETTING OF DATA TO BE IMPRINTED" and "SETTING OF INTERVAL TIMER" are displayed.

When "SETTING OF TIME" in FIG. 9A is selected by depressing the up/down keys 7a and 7b and the execution key 7c is depressed, the display as shown in FIG. 9B appears. It displays the current year, month, day, hour and minute by a clock built in the terminal device 2. The displayed time is sent to the camera 1 asking whether it is to be set in the camera 1. When the Y key of the keyboard 7 is depressed, it is sent to the camera 1 and set therein, and when the N key is depressed, the time is not set.

When "INTERVAL TIMER" in FIG. 9A is selected by the up/down keys 7a and 7b and the execution key 7c is depressed, the display as shown in FIG. 9C appears. It displays the information on the interval timer which was previously set, and the setting may be changed sequentially. A cursor is moved to the numeric areas of "START AT", "INTERVAL" and "THE NUMBER OF TIMES" in FIG. 9C so that the contents may be changed by depressing numerical keys of the keyboard 7. After the numeric value is entered, the execution key 7c is depressed so that the content set by the terminal device 2 is sent to the camera 1 and set therein.

Usually, a power supply of the camera is automatically turned off a predetermined time after certain operation. Usually, the time interval is between 8-16 seconds. However, there is a problem if the power supply of the camera 1 is turned off in such a short time after the communication with the terminal device 2 has been established, because when a command is to be sent to the camera 1 by manipulating the keyboard 7 of the terminal device 7, the manipulation of the keyboard 7 may not be completed in 8-16 seconds. To avoid such a problem, the turn-off of the power supply of the camera 1 is prevented by extending the timer interval when the communication is established, inhibiting the timer operation, or sending a specific command to the camera even if no transmission of the command or data to the camera is required while the terminal device 2 is not operated or the keyboard is manipulated.

In FIG. 10, the terminal device 2 requests the type code data to the camera 1, and the camera 1 responds thereto to transmit the camera type code. The terminal device 2 compares the code with the code stored in the IC card 3, and if they match, it sends a timer prolongation command to the camera 1. If the type code of the camera 1 and the type code of the IC card 3 of the terminal device 2 do not match, the terminal device 2 displays an error message. An example thereof is shown in FIG. 7. When the character code which represents the type of camera is used as the type code, the error message is easy to recognize as shown in FIG. 7.

The timer prolongation command in FIG. 10 may be a command to inhibit the power-off by the timer for the camera 1, or a command to set a longer timer interval than a normal one. A command may be continuously sent at an interval shorter than the timer interval of the camera 1 during the operation of the terminal device 2 in order to prevent the power-off of the camera 1. In this manner, inadvertent power-off of the camera during the operation of the terminal device 2 is prevented.

Figure 11:
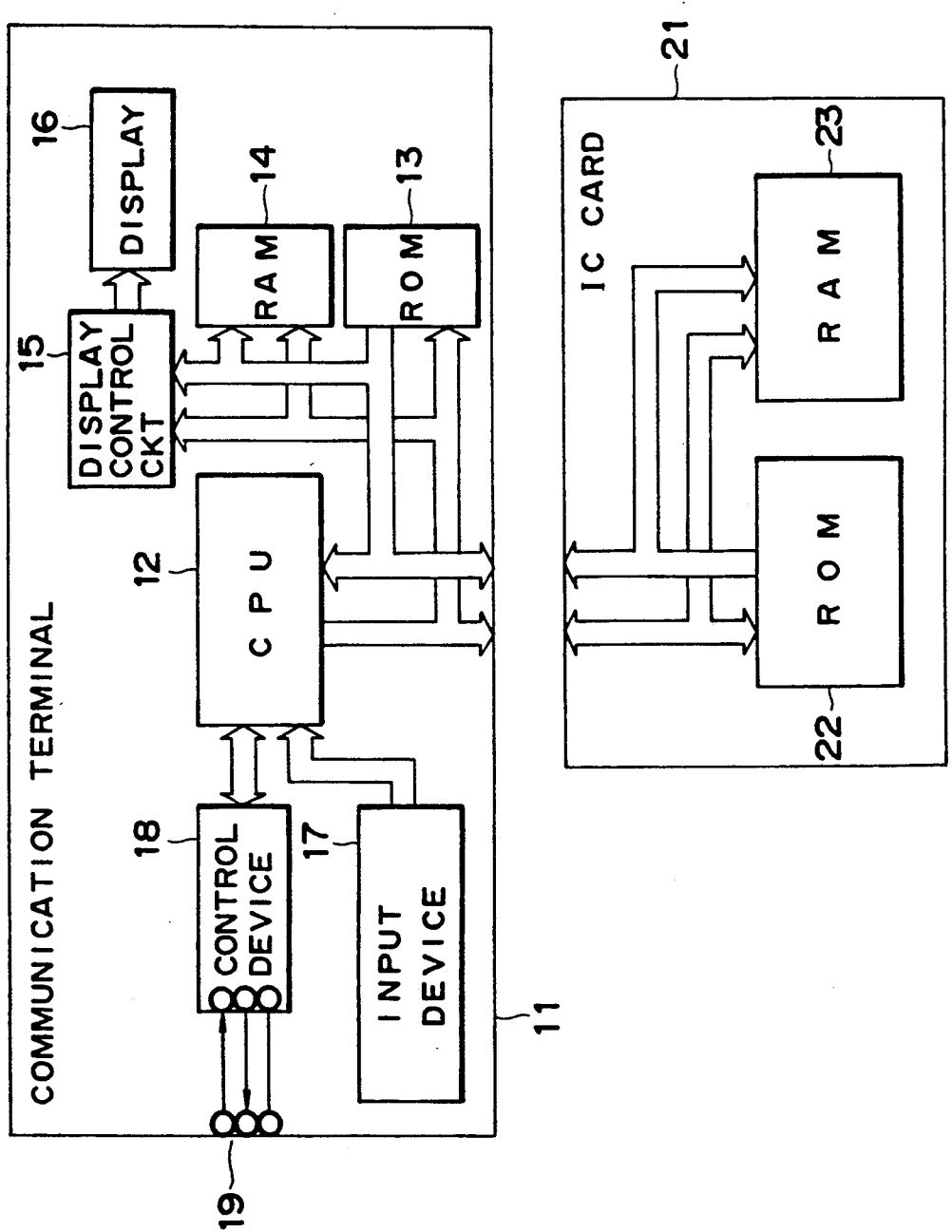
FIG. 11 shows a detailed block diagram of a terminal device and an IC card.

FIG. 11 shows a detailed internal configuration of the terminal device 2 and the IC card 3 shown in FIG. 1A. Numeral 11 corresponds to the terminal device 2 in FIG. 1A, numeral 12 denotes a CPU for carrying out an arithmetic operation and controlling the terminal device 2, numeral 13 denotes a ROM which stores a program for controlling the CPU, numeral 14 denotes a RAM for storing data, numeral 15 denotes a display control circuit such as an LCD driver, numeral 16 denotes a display such as an LCD, numeral 17 denotes an input device such as a keyboard for entering a command and data to the CPU, numeral 18 denotes a serial communication control device for serially communicating with the camera and numeral 19 denotes a serial communication terminal. The ROM 13, the RAM 14 and the display control circuit 15 are connected to the CPU 12 through an address bus and a data bus. Numeral 21 corresponds to the IC card 3 in FIG. 1A, numeral 22 denotes a ROM and numeral 23 denotes a RAM.

The terminal device 11 is usually operated by the program stored in the ROM 13. When the IC card 21 is connected and the operation thereby is selected, the terminal device 11 is operated by the program stored in the ROM 22 of the IC card 21.

Figure 12:
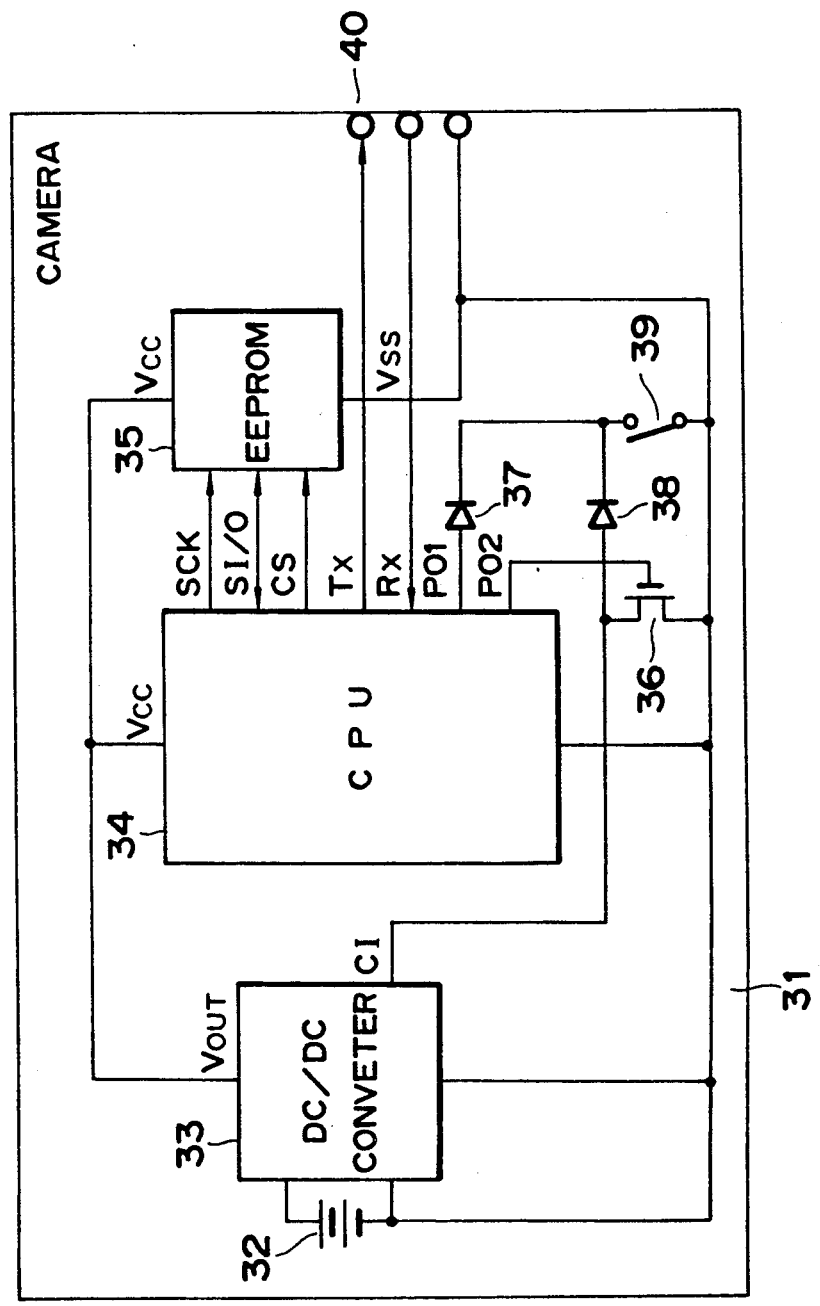
FIG. 12 shows a detailed block diagram of a camera.

FIG. 12 shows a portion of the configuration of the camera in the present invention. Numeral 31 corresponds to the camera 1 in FIG. 1A, numeral 32 denotes a battery, and numeral 33 denotes a DC-DC converter for converting the battery voltage to a stabilized voltage, which has a power input terminal connected to the battery 32 and a CI terminal which is an input terminal for controlling an output. When the CI terminal is grounded, a stabilized voltage is produced at an output terminal Vout. Numeral 34 denotes a CPU which comprises arithmetic operation means, comparison means, a ROM and a RAM. If further comprises memory means, timer means and input/output means and controls the camera. Numeral 35 denotes an EEPROM which is electrically writable and erasable memory means, numeral 36 denotes an FET, numerals 37 and 38 denote diodes, numeral 39 denotes a switch and numeral 40 denotes a communication terminal.

The switch 39 serves to start the camera. It may be turned on at a first stroke of a release button of the camera. When it is turned on, a signal is applied to the CI terminal of the DC-DC converter 33 through the diode 37 so that the DC-DC converter 33 starts the operation and produces a voltage at the output terminal Vout. Thus, the power is supplied to the microcomputer 34, the EEROM 35 and other electronic circuits (not shown). Thus, the microcomputer 34 starts the operation.

As the microcomputer 34 starts the operation, it produces a "1" level output at an output port PO2. It is applied to a gate terminal of the FET 36 so that the FET 36 is turned on and a drain terminal thereof assumes a "0" level. Thus, the CI terminal of the DC-DC converter 33 is "0" level and the DC-DC converter 33 continues the operation.

A predetermined time after the end of the manipulation of the camera, the output port PO2 of the microcomputer 34 produces the "0" level signal. Thus, the CI terminal of the DC-DC converter 33 is "1" level and the operation of the camera is terminated. The input port PO1 of the microcomputer 34 reads the status of the switch 39. It is connected to one end of the switch 39 through the diode 37.

The operation when "COMMUNICATION WITH CAMERA" in FIG. 2 is selected is now explained. When "COMMUNICATION WITH CAMERA" is selected by the terminal device 2, the terminal device 2 produces the serial signal at the serial terminal 19 of FIG. 9. In order to identify the IC card loaded to the terminal device and the type of camera to be communicated with, a command requesting the camera type code is transmitted. The camera responds to the command by producing the type code at the serial terminal (40 in FIG. 10). The terminal device compares the code with the information of the IC card, and if they match, it permits further communication and sends a command to the camera not to time out the power-off timer of the camera.

Figure 13:
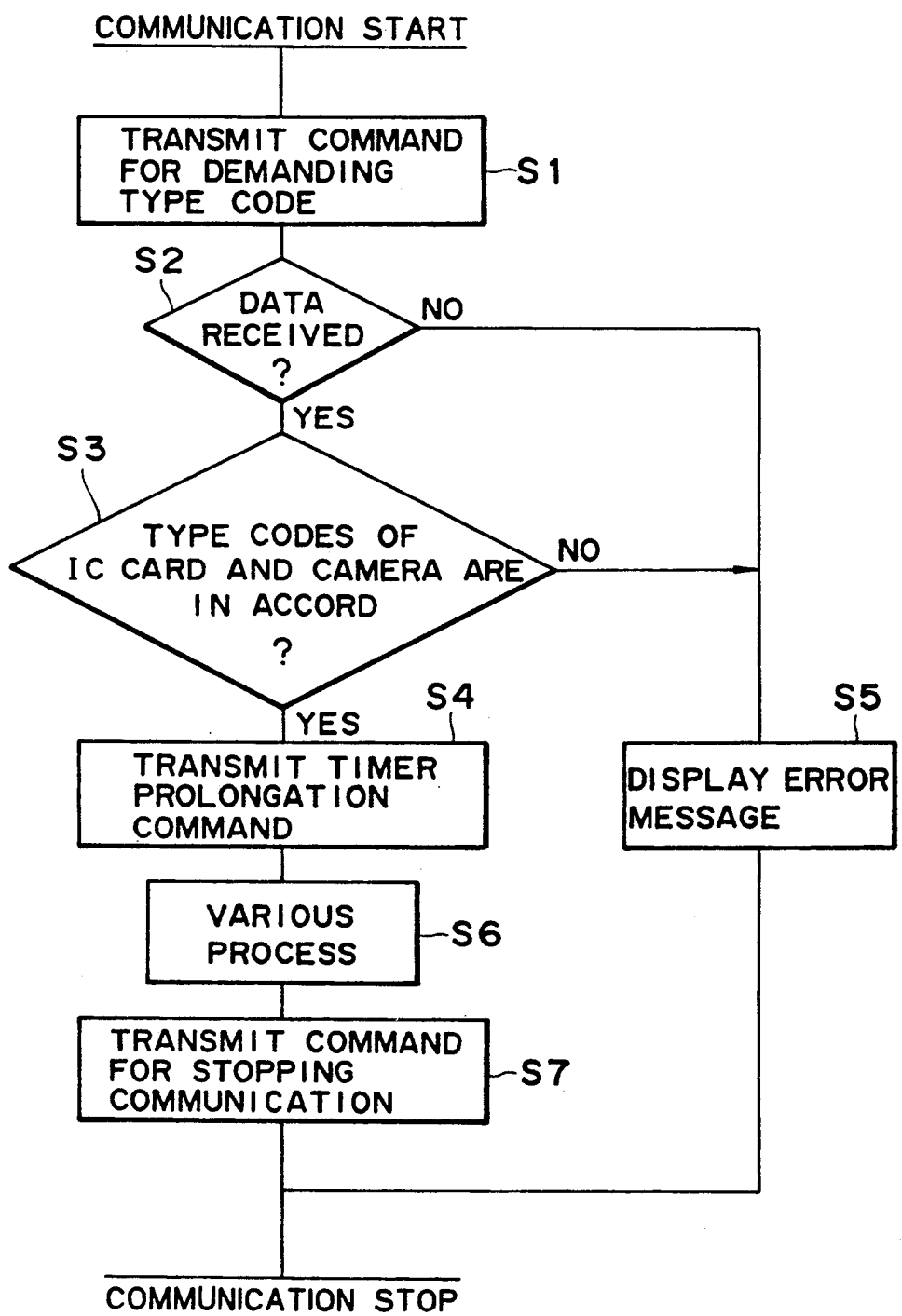
FIG. 13 shows a flow chart of a signal transmission and reception process.

A flow chart of the above process is shown in FIG. 13. When the communication is started, the terminal device 2 sends the type code request command to the camera 1 in a step 1. In a step 2, it receives data from the camera 1. In a step 3, it compares the received data with the code in the IC card, and if they match, it sends the timer prolongation command to the camera in a step 4.

If data is not received from the camera within a predetermined time or if the code does not match to the code in the IC card in the step 3, an error message is displayed in the terminal device in a step 5 and the communication is terminated. In the step 4, a timer-off inhibit command may be sent to the camera. In a step 6, a command is sent to the camera and the information of the camera is received. In a step 7, an end of communication command is sent to the camera, and the camera resumes the normal timer prolongation operation.

Alternatively, the communication may be repeatedly made at an interval shorter than the timer interval of the camera. In this manner, the power-off of the camera during the operation of the terminal device and the disconnection of data communication between the terminal device and the camera are prevented.

What is claimed is:

1. A camera system comprising:
   a terminal device including an IC card for storing information on a camera, display means for reading and displaying the information of said IC card and communication means for transmitting those of the read information which are necessary to set an operation condition of the camera to the camera;
   the camera having a connector for receiving the information necessary to set the operation condition of the camera through the connector; and
   connection means for connecting said communication means for said terminal device and said connector of said camera.

2. A camera system according to claim 1 wherein said camera produces a type code indicating a type of its own at said connector, and said terminal device compares the type code with the information of the IC card to determine whether the IC card is compatible to the camera.

3. A camera system according to claim 2 wherein said terminal device sends a command to prolong an interval of a power auto-shut-off timer of the camera when the IC card is compatible to the camera.

4. A camera system according to claim 1 wherein said display means of said terminal device displays information on a photographing control status preset in the camera.

5. A camera system according to claim 1 wherein said display means of said terminal device displays an error message when an operation condition compatible to a photographing control status preset in the camera is to be set by said terminal device.

6. A camera system according to claim 1 wherein said IC card includes a memory for storing data to be displayed including description on the camera and data to be used in setting an operation condition of the camera from said terminal device.

* * * * *

UNITED STATES PATENT AND TRADEMARK OFFICE
CERTIFICATE OF CORRECTION

PATENT NO. : 5,198,851
DATED     : March 30, 1993
INVENTOR(S) : Hidehiro OGAWA

It is certified that error appears in the above-identified patent and that said Letters Patent is hereby corrected as shown below:

Column 8, (claim 2) line 2, "produces" should read
      --outputs--;
                                line 3, "at" should read --from--.

Signed and Sealed this

Twenty-first Day of December, 1993

Attest:

BRUCE LEHMAN

*Attesting Officer*      *Commissioner of Patents and Trademarks*